United States Patent
Hisatomi et al.

(10) Patent No.: US 6,342,954 B1
(45) Date of Patent: Jan. 29, 2002

(54) IMAGE INFORMATION PROCESSOR AND IMAGE INFORMATION TRANSMITTER

(75) Inventors: Kenji Hisatomi, Moriguchi; Takehito Yamaguchi, Hirakata; Kazuyuki Murata, Kyotanabe; Shigeru Matsukawa, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/882,052

(22) Filed: Jun. 25, 1997

(30) Foreign Application Priority Data

Jun. 25, 1996 (JP) ............................................. 8-164016

(51) Int. Cl.$^7$ ................................................. H04N 1/00
(52) U.S. Cl. ........................ 358/403; 358/405; 358/437; 358/468
(58) Field of Search ................................. 358/403, 442, 358/468, 400, 405, 434, 437; 382/276

(56) References Cited

U.S. PATENT DOCUMENTS

| | | | |
|---|---|---|---|
| 4,591,921 A | | 5/1986 | Nakajima ................... 358/400 |
| 5,222,157 A | * | 6/1993 | Yoneda et al. ............... 382/41 |
| 5,499,108 A | * | 3/1996 | Cotte et al. ................ 358/400 |
| 5,521,974 A | * | 5/1996 | Hayashi et al. ............. 379/381 |
| 5,579,392 A | * | 11/1996 | Holzer ........................ 380/18 |
| 5,781,901 A | * | 7/1998 | Kuzma ....................... 358/402 |
| 5,896,204 A | * | 4/1999 | Sato et al. .................. 358/405 |

FOREIGN PATENT DOCUMENTS

| | | |
|---|---|---|
| EP | 435254 | 7/1991 |
| EP | 0 531 062 A2 | 3/1993 |
| EP | 621721 | 10/1994 |
| EP | 751672 | 1/1997 |
| JP | S62-157471 | 7/1987 |
| JP | 63-204874 | 8/1988 |
| JP | 2-111161 | 4/1990 |
| JP | H4-7788 | 1/1992 |
| JP | H4-86064 | 3/1992 |
| JP | H6-217045 | 8/1994 |

* cited by examiner

Primary Examiner—Cheukfan Lee
(74) Attorney, Agent, or Firm—Ratner & Prestia

(57) ABSTRACT

An image information processor has an image superimposing and outputting means for printing out a superimposed image where a bar code representative of a storage location of an electronic document file received through a facsimile is superimposed on the first page of the electronic document file. When a necessary electronic document file is read out, the bar code is read from the printed output corresponding to the necessary electronic document file being set by the user, the storage location of the electronic document file is decrypted from the bar code to thereby identify and read out the electronic document file. In this case, the reading of the bar code is performed only when a permitted password is inputted by the user. The readout of the electronic document file is not performed otherwise.

7 Claims, 12 Drawing Sheets

IMAGE INFORMATION PROCESSOR AND IMAGE INFORMATION TRANSMITTER

BACKGROUND OF THE INVENTION

1. Field of the Invention

The present invention relates to an image information processor such as an electronic filing apparatus having a means for storing electronic document data.

2. Description of the Related Art

In recent years, an image information processor has been developed in which electronic document data being transmitted and received are stored as electronic document files in a storage means such as a memory and the contents in the memory can be confirmed on a display unit. For example, as shown in Japanese Laid-open Patent Application No. H4-86064, this type of image information processor has a function of storing received electronic document files in the storage means so that the stored files may be printed out by the user's operation. Therefore, the electronic document files stored in the storage means are first confirmed on the display unit for selection and then, the selected file is printed out through a printer.

Figure 10:
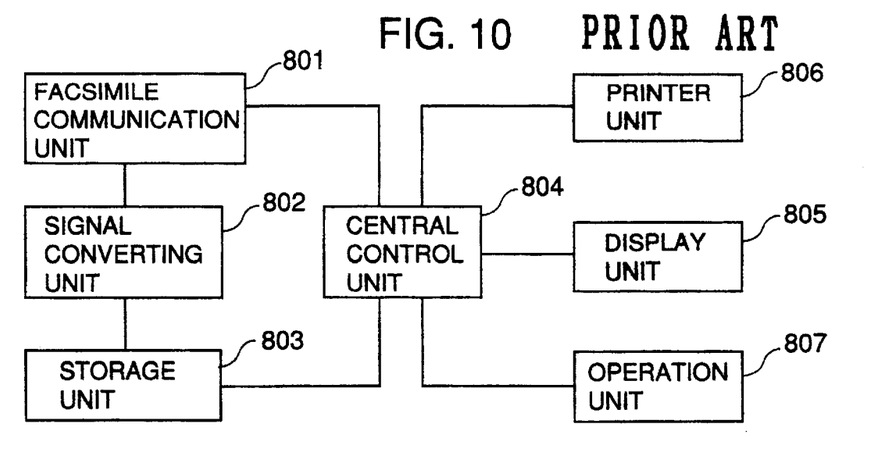
FIG. 10 schematically shows the structure of a conventional electronic filing apparatus.

FIG. 10 shows a prior art of the image information processor having a storage means. In the image information processor shown in FIG. 10, when connection to the line is made by a facsimile communication unit 801, the transmission protocol is decided by the transmitting side facsimile and a central control unit 804, and a facsimile signal is sent from the transmitting side facsimile. The facsimile signal is converted into a binary signal by a signal converting unit 802 and after indices such as the date and the identification (ID) code of the transmitting side are added, the binary data are stored in a storage unit 803. The contents in the storage unit 803 together with the indices are displayed on a display unit 805 by operating an operation unit 807. Looking at the display, the user determines whether the received data are necessary or not, and prints out only necessary documents onto recording paper through a printer unit 806 by operating the operation unit 807. The unnecessary documents are erased from the storage unit 803 without being printed out.

Figure 11:
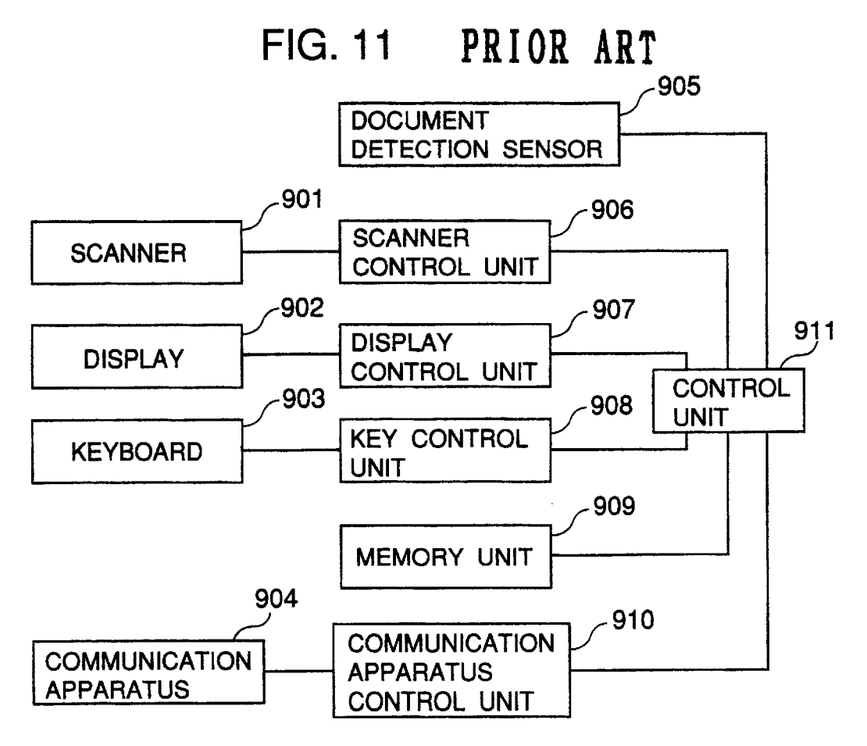
FIG. 11 schematically shows the structure of another conventional electronic filing apparatus.

Moreover, as shown in Japanese Laid-open Patent Application H6-217045, the image information processor may be arranged so that the electronic document files being stored are displayed on a display terminal to perform a search and the selected electronic document file stored in the storage means is transmitted together with image information of an attached document being read in. FIG. 11 shows a prior art of the image information processor having a storage means. In a facsimile apparatus having a reading means 902 for reading the character image of an attached document being set and a storage means 909 for storing electronic document data, the following means are provided: a detection means 901 for detecting the presence/absence of the attached document being set on the reading means 902; and a control means for controlling so that when the detection means 901 detects the presence of the attached document, the electronic document data read by the reading means 902 are also transmitted in transmitting the electronic document data stored in the storage means 909. A facsimile cover sheet which is the attached document being set on the reading means 902 and the electronic document data stored in the storage means 909 can be transmitted together to another facsimile.

Figure 12:
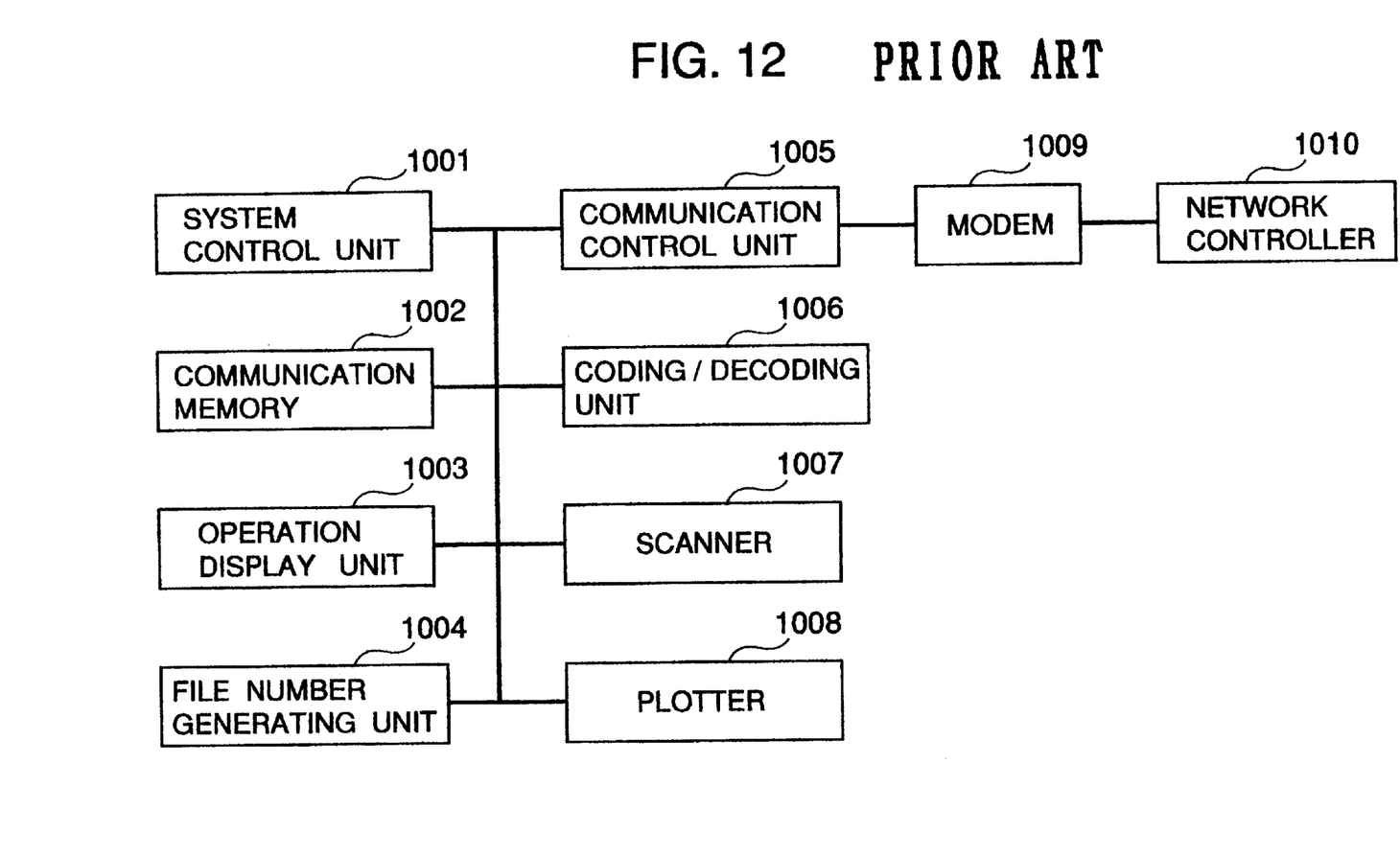
FIG. 12 schematically shows the structure of another conventional electronic filing apparatus.

Moreover, as shown in Japanese Laid-open Patent Application No. S62-157471, the image information processor may have a simple confidential reception function which enables communications respecting each receiver's privacy so that only the receiver's name and the file number are outputted onto the recording paper at the time of facsimile reception and only the facsimile-received document of the specified file number is outputted in taking out facsimile-received documents. FIG. 12 shows a prior art of the image information processor having a storage means. In the prior art, when a confidential reception mode is set by an operation button of an operation display unit 1003, the facsimile performs a receiving operation in the following manner: When a document to be transmitted is set on a transmitting side facsimile (hereinafter, referred to as transmitting station) and transmission is started, on the receiving side, a network controller 1010 senses a call signal and performs switching from the telephone section to the main section of the apparatus. A system control unit 1001 causes a file number generating unit 1004 to generate a file number and stores the file number in an image memory 1002 so that facsimile-received documents are successively stored in the memory area corresponding to the file number. At a plotter 1008, recording paper is outputted having a width D where only the receiver's name entered on the transmitting side and a file number Fno recorded by the facsimile are shown.

In the image information processor, however, when selection is made from among the electronic document files being stored, it is necessary to display the electronic document files on the display screen and perform a search to make a decision. Therefore, as the number of stored electronic document files increases, the search becomes more complicated and requires more time. Additionally, the provision of the display unit such as the display screen for displaying the details of the images increases the cost.

Further, when an electronic document file is facsimile-transmitted together with an attached document, it is necessary to follow a complicated procedure such that after the electronic document file is searched for and the attached document is read in, both are correlated.

Moreover, in inputting from the keyboard a number outputted when a received document stored in the storage means is taken out, there is a risk of input error.

SUMMARY OF THE INVENTION

In view of the above-mentioned problems of the prior arts, an object of the present invention is to provide an image information processor and an image information communication apparatus where the identification of electronic document files stored in the storage means such as a memory is more easily performed.

In order to achieve the above-mentioned object, the present invention of an image information processor comprises: storage means for storing a plurality of electronic document files; image superimposing and outputting means for superimposing identification information for identifying a predetermined electronic document file stored in the storage means on image information of a specific page of the predetermined electronic document file, and printing out the superimposed image; and readout means for reading a printed output of the superimposed image, reading the identification information included in the superimposed image, and reading a corresponding electronic document file from the storage means based on the file identification information, wherein when an attached document is read in together with the printed output of the superimposed image, the readout means makes a distinction between the printed output of the superimposed image and the attached document by use of the identification information.

The present invention of an image information processor comprises: storage means for storing a plurality of electronic document files; image superimposing and outputting means for superimposing identification information for identifying a predetermined electronic document file stored in the storage means on image information of a specific page of the predetermined electronic document file, and printing out the superimposed image; readout means for reading a printed output of the superimposed image, reading the identification information included in the superimposed image, and reading a corresponding electronic document file from the storage means based on the file identification information; and facsimile reception means for receiving data transmitted from a facsimile,     wherein the plurality of electronic document files stored in the storage means include a file received by the facsimile reception means.

The present invention of an image information processor comprises: storage means for storing a plurality of electronic document files; image superimposing and outputting means for superimposing identification information for identifying a predetermined electronic document file stored in the storage means on image information of a specific page of the predetermined electronic document file, and printing out the superimposed image; and readout means for reading a printed output of the superimposed image, reading the identification information included in the superimposed image, and reading a corresponding electronic document file from the storage means based on the file identification information,     wherein said readout means collates input password information being inputted with previously-recorded use permission information, and reads out an electronic document file being stored only when both of the information coincide with each other.

The present invention of an image information processor comprises: storage means for storing a plurality of electronic document files; image superimposing and outputting means for superimposing identification information for identifying a predetermined electronic document file stored in the storage means on image information of a specific page of the predetermined electronic document file, and printing out the superimposed image; readout means for reading a printed output where the superimposed image is shown, reading the identification information included in the superimposed image, and reading a corresponding electronic document file from the storage means based on the file identification information; facsimile communication means for transmitting and receiving according to a facsimile format the electronic document file read out by the readout means; transmission error message generating and outputting means for adding at least receiver information for identifying a receiver of an electronic document file whose transmission resulted in error and identification information for identifying the electronic document file to a medium on which a transmission error message is shown, said medium being outputted when a transmission error occurs during transmission according to the facsimile format; and re-transmission control means for, when re-transmission according to the facsimile format is directed, causing the facsimile communication means to re-transmit the electronic document file whose transmission resulted in error by using at least the receiver information and the identification information added to the medium being outputted.

The present invention of an image information communication apparatus comprises: facsimile communication means for transmitting and receiving image information according to a facsimile format; re-transmission information generating means for, when a transmission error occurs during transmission according to the facsimile format, generating, together with a transmission error message, re-transmission information including receiver information for identifying a receiver of the facsimile transmission and information for identifying image information whose transmission resulted in error; and re-transmission control means for, when re-transmission according to the facsimile format is directed, causing the facsimile communication means to re-transmit the image information whose transmission resulted in error by using the re-transmission information being generated.

According to the present invention, in an image information processor having storage means for storing an electronic document file, for example, file storage location information of the electronic document file is printed out onto a sheet of paper together with the image of the first page, and in identifying the electronic document file, the printed sheet is read in and the file storage location information is obtained to thereby take out a desired electronic document file.

Moreover, in reading the image of the storage location information of the electronic document file, the document to be transmitted is also read in and facsimile-transmitted together with the electronic document file, for example, to the same receiver.

Inputted use permission information is collated with previously-recorded use permission information and only when both coincide with each other, the facsimile-received document, for example, is printed out.

DESCRIPTION OF THE REFERENCE DESIGNATIONS

101 CPU
102 ROM

103 RAM
104 IMAGE-ONLY RAM
105 SYSTEM BUS
106 HDD
107 HDD I/F
108 KEYBOARD
109 KEYBOARD I/F
110 IMAGE READER
111 IMAGE READER I/F
112 IMAGE PRINTER
113 IMAGE PRINTER I/F
114 FACSIMILE RECEIVER
115 FACSIMILE RECEIVER I/F
116 FACSIMILE TRANSMITTER
117 FACSIMILE TRANSMITTER I/F
801 FACSIMILE COMMUNICATION UNIT
802 SIGNAL CONVERTING UNIT
803 STORAGE UNIT
804 CENTRAL CONTROL UNIT
805 PRINTER UNIT
806 DISPLAY UNIT
807 OPERATION UNIT
901 SCANNER
902 DISPLAY
903 KEYBOARD
904 COMMUNICATION APPARATUS
905 DOCUMENT DETECTION SENSOR
906 SCANNER CONTROL UNIT
907 DISPLAY CONTROL UNIT
908 KEY CONTROL UNIT
909 MEMORY UNIT
910 COMMUNICATION APPARATUS CONTROL UNIT
911 CONTROL UNIT
1001 SYSTEM CONTROL UNIT
1002 COMMUNICATION MEMORY
1003 OPERATION DISPLAY UNIT
1004 FILE NUMBER GENERATING UNIT
1005 COMMUNICATION CONTROL UNIT
1006 CODING/DECODING UNIT
1007 SCANNER
1008 PLOTTER
1009 MODEM
1010 NETWORK CONTROLLER

DESCRIPTION OF THE PREFERRED EMBODIMENTS

Hereinafter, embodiments of the, present invention will be described with reference to the drawings.

Figure 1:
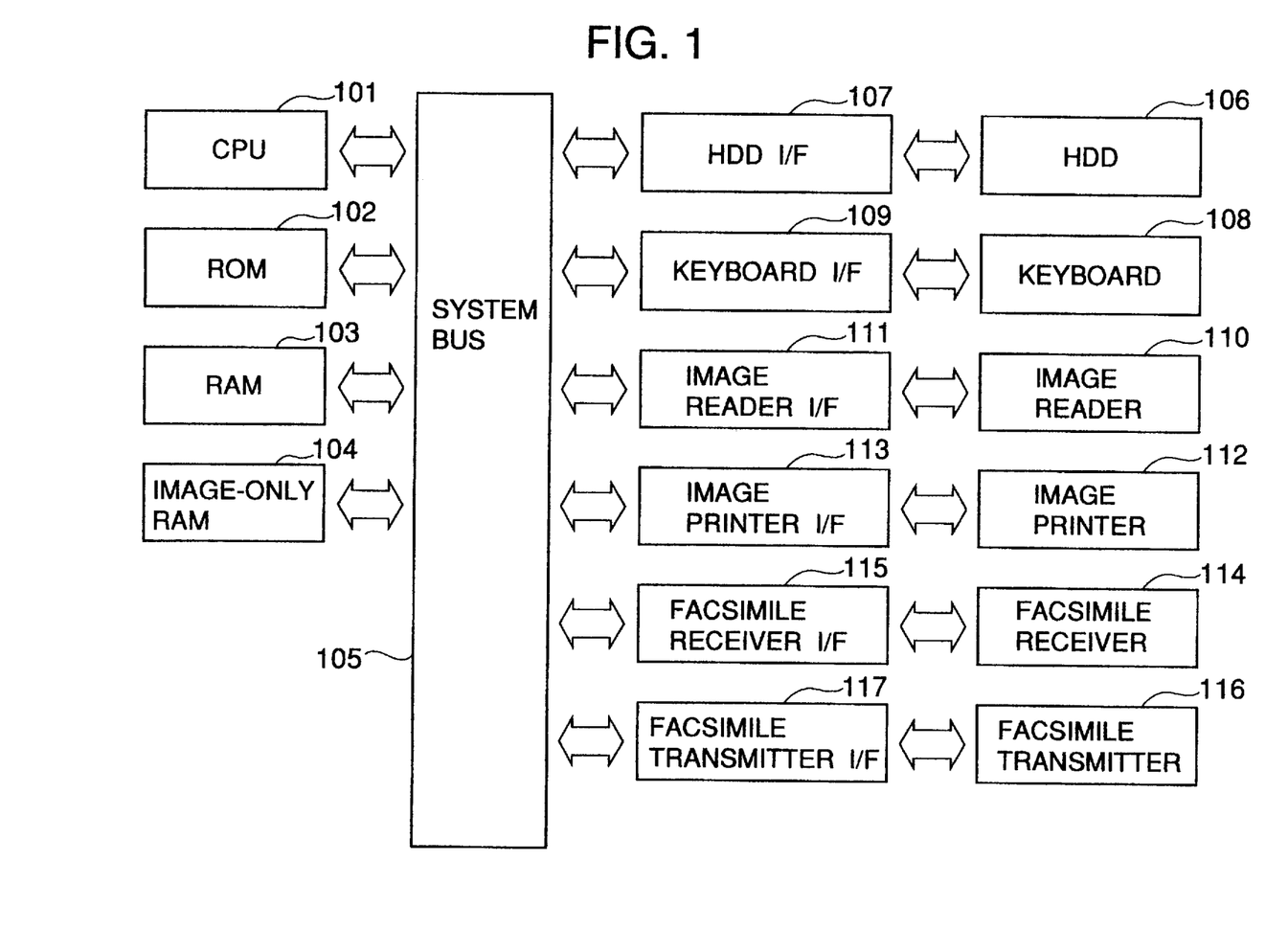
FIG. 1 shows the structure of an image information processor according to embodiments of the present invention.

Referring to FIG. 1, an image information processor according to the embodiments of the present invention includes a central processing unit (CPU) 101 which is a microprocessor serving as a control means, a read only memory (ROM) 102 normally storing a program which defines operation procedures of the CPU 101, a random access memory (RAM) 103 for temporarily storing set information which RAM 103 also serves as the work area of the CPU 101, an image-only RAM 104 for storing images, a system bus 105 for connecting devices, a hard disk drive (HDD) 106 for holding electronic document files, a keyboard 108 serving as a use's instruction inputting means, an image reader 110 for reading images, an image printer 112 for printing images, a facsimile receiver 114 for performing a facsimile reception processing, and a facsimile transmitter 116 for performing a facsimile transmission processing. The image information processor further includes an HDD interface (I/F) 107 for connecting the HDD 106 and the system bus 105, a keyboard I/F 109 for connecting the keyboard 108 and the system bus 105, an image reader I/F 111 for connecting the image reader 110 and the system bus 105, an image printer I/F 113 for connecting the image printer 112 and the system bus 105, a facsimile receiver I/F 115 for connecting the facsimile receiver 114 and the system bus 105, and a facsimile transmitter I/F 117 for connecting the facsimile transmitter 116 and the system bus 105. FIG. 1 shows the structure of the embodiment.

Figure 2:
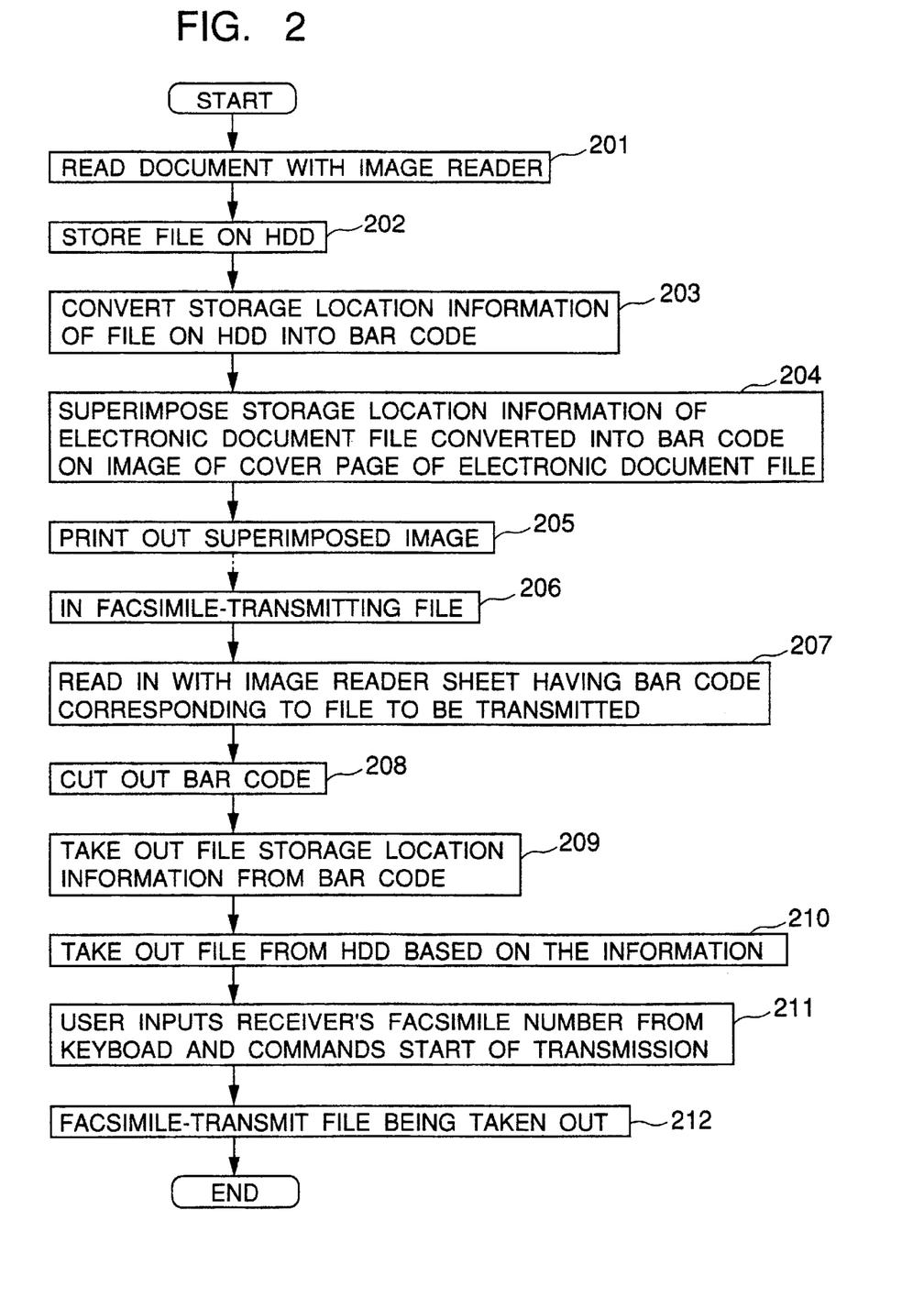
FIG. 2 is a flowchart of an embodiment of the present invention.

Subsequently, an operation procedure of a first embodiment will be described with reference to the structural view of FIG. 1 and the flowchart shown in FIG. 2.

Figure 6:
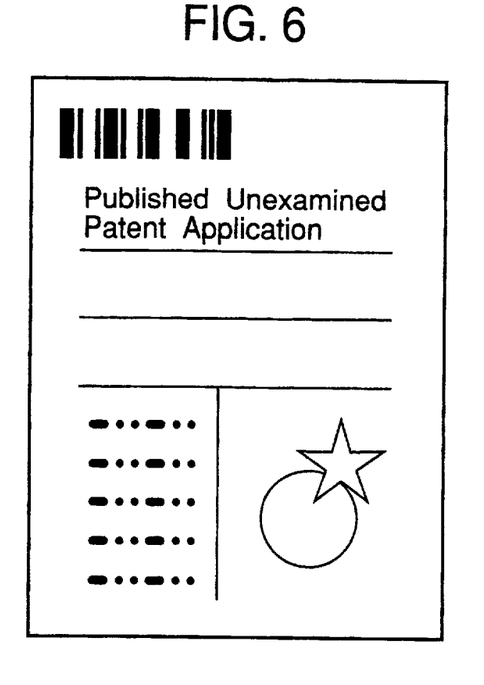
FIG. 6 shows an example of a printed output of a bar code corresponding to a file according to the present invention.

The image read by the image reader 110(201) is stored on the HDD 106 as an electronic document file by the CPU 101 (202). The CPU 101 reads out the file name of the electronic document file as storage location information, converts it into a bar code (203) and places it on the RAM 103. The bar code may be a character string. Then, the CPU 101 takes out the first page of the image being read out and places it on the image-only RAM 104. Then, the CPU 101 superimposes the bar code on the image of the cover page to form a superimposed image and places it on the image-only RAM 104 (204). Then, the CPU 101 reads out the superimposed image from the image-only RAM 104 and prints it out through the Image printer 112 (205). An example of the printed output is shown in FIG. 6.

In performing facsimile transmission by taking out a file on the HDD 106 (206), the user selects the printed output of the superimposed image corresponding to the file to be transmitted and reads it in with the image reader 110 (207). The superimposed image being read in is placed on the image-only RAM 104 and the CPU 101 cuts out the bar code from the superimposed image (208), obtains the file storage location information from the bar code (209), takes out a file corresponding to the bar code based on the information and places the file on the image-only RAM 104 (210). From the keyboard 108, the user commands the CPU 101 to perform facsimile transmission (211) and the CPU 101 transmits the file on the image-only RAM 104 from the facsimile transmitter 116 (212).

Figure 3A:
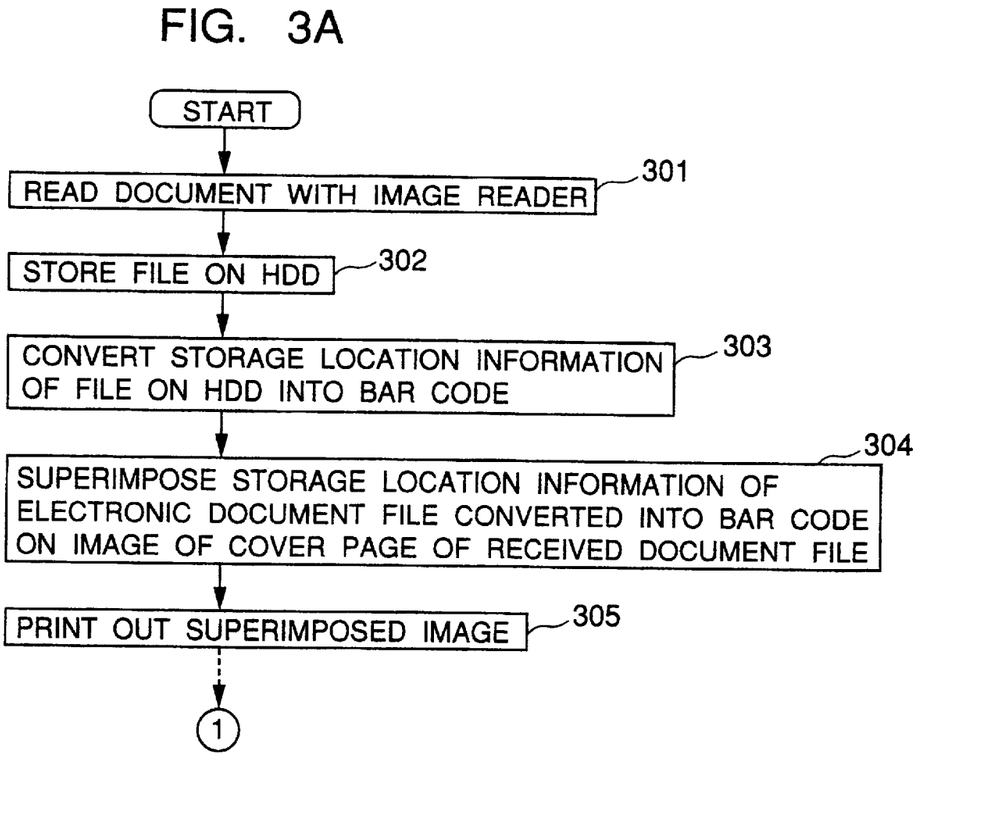
FIG. 3A is a flowchart of an embodiment of the present invention.
Figure 3B:
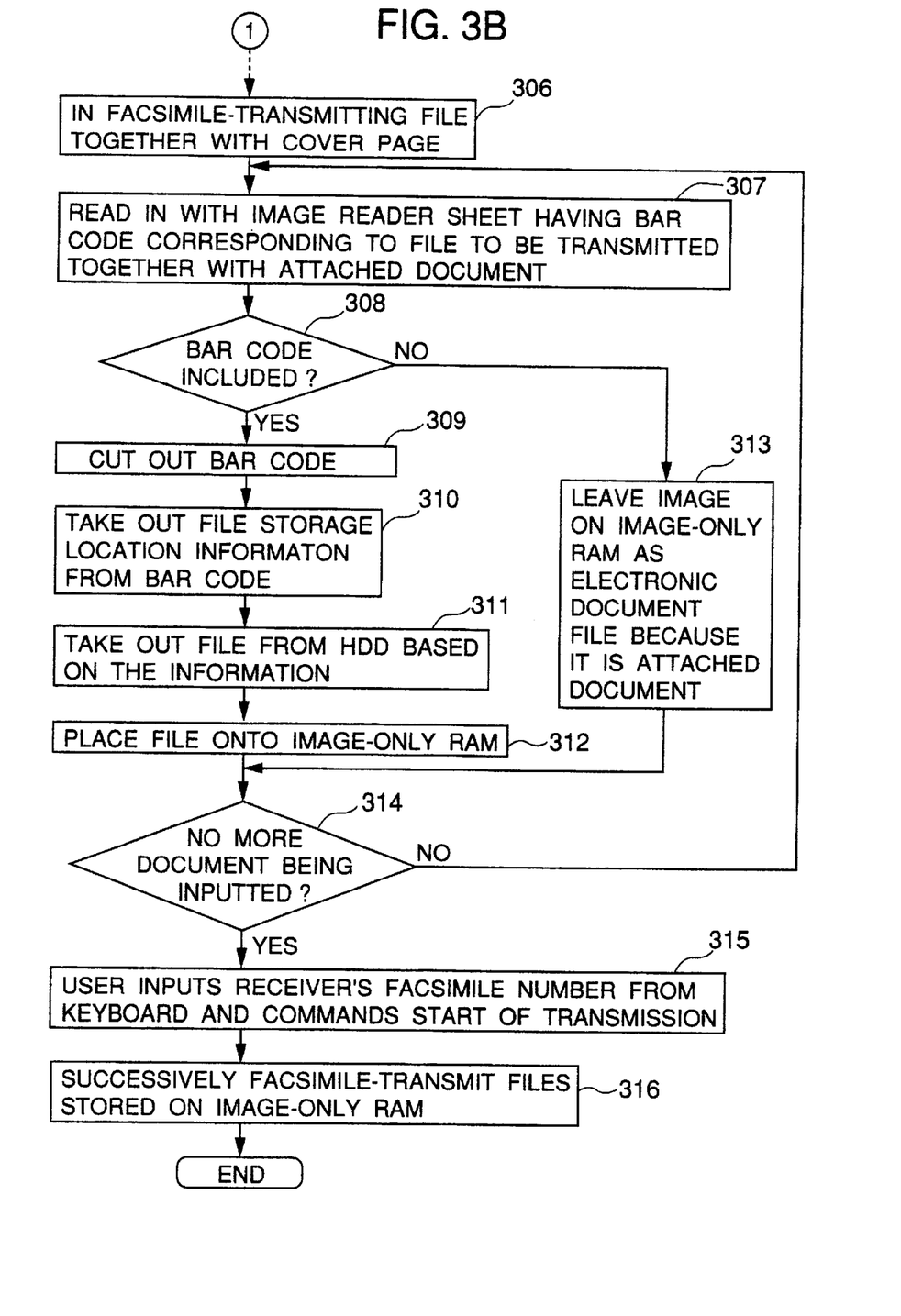
FIG. 3B is a flowchart of the embodiment of the present invention.

Subsequently, an operation procedure of a second embodiment will be described with reference to the structural view of FIG. 1 and the flowcharts of FIGS. 3A and 3B. The structure of the image information processor of this embodiment will not be described because it is basically the same as that of FIG. 1. In FIG. 5A, steps 301 to 305 are similar to steps 201 to 205 in FIG. 2, and their descriptions are omitted for brevity.

At step 206 of the operation procedure of the first embodiment, in reading in the printed superimposed image with the image reader 110 to take out a desired file from the HDD 106 (306), the user reads in a document to be attached with the image reader 110 (307). The superimposed image and the attached document being read in are placed on the image-only RAM 104 and transmitted to the CPU 101 every image corresponding to one page. The CPU 101 determines whether the image is a superimposed image or an attached document based on whether the bar code is included or not (308). When the image is not a superimposed image, it is left on the image-only RAM 104 because it is an attached document (313). When the image is a superimposed image, the CPU 101 cuts out the bar code from the superimposed image (309), obtains file storage location information from the bar code (310), takes out a desired file from the HDD 106 based on the information (311) and places the file on the image-only RAM 104 (312). These operations are finished when they have been performed for all the documents being read in (314).

Then, from the keyboard 108, the user commands the CPU 101 to perform facsimile transmission (315), and the CPU 101 transmits through the facsimile transmitter 116 the desired file data on the image-only RAM 104 together with the attached document data (316). This enables the user to facsimile-transmit an electronic document file together with an attached document to the same receiver without any need to search the HDD 106 for the file. The bar code may be a character string.

Figure 4:
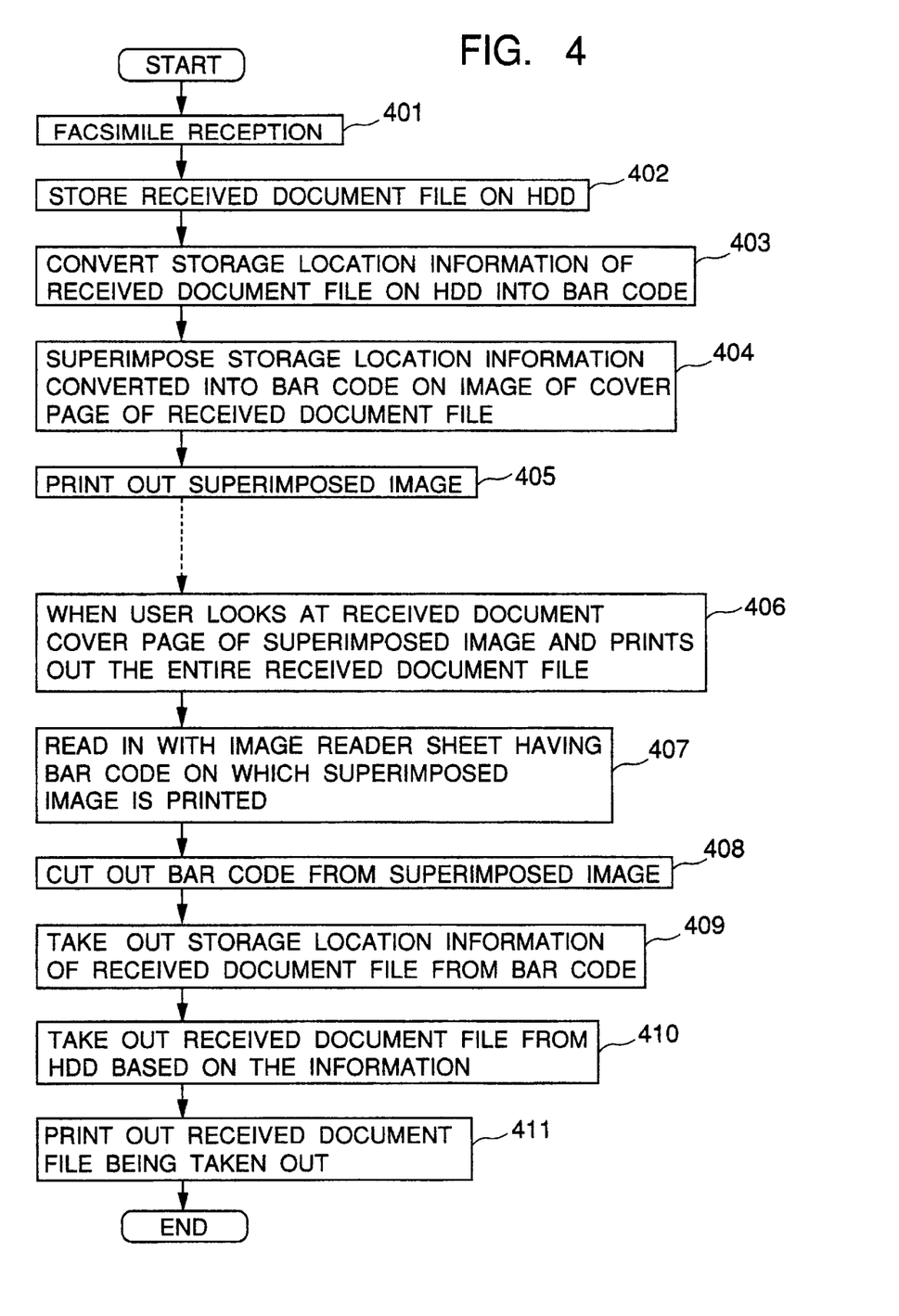
FIG. 4 is a flowchart of an embodiment of the present invention.

Subsequently, an operation procedure of a third embodiment will be described with reference to the structural view of FIG. 1 and the flowchart of FIG. 4. The structure of the image information processor of this embodiment will not be described because it is basically the same as that of FIG. 1.

Figure 7:
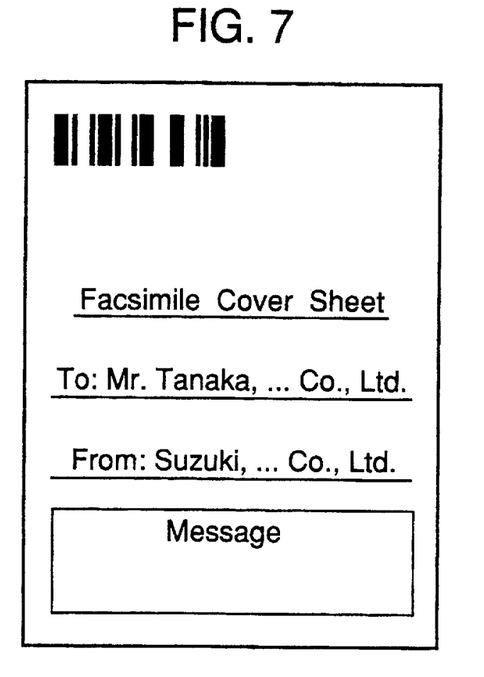
FIG. 7 shows an example of a printed output of a superimposed image according to the present invention.

The document received by the facsimile receiver 114 (401) is stored on the HDD 106 by the CPU 101 (402). The CPU 101 reads out storage location information of the received document file on the HDD 106, converts the information into a bar code and places it on the RAM 103 (403). The bar code may be a character string. Then, the CPU 101 takes out the image of the cover page or the first page of the received document file and places it on the image-only RAM 104. The CPU 101 superimposes the bar code on the RAM 103 on the image of the cover page on the image-only RAM 104 (404) and prints it out through the image printer 112 (405). An example of the printed output is shown in FIG. 7.

When the user looks at the printed superimposed image to take out the received document file on the HDD 106 and prints it out (406), the user reads in the printed superimposed image with the image reader 110 (407). The superimposed image being read in is placed on the image-only RAM 104. The CPU 101 cuts out the bar code from the superimposed image (408), obtains file storage location information from the bar code (409), takes out the received document file from the HDD 106 based on the information and places it on the image-only RAM 104 (410). Then, the CPU 101 prints out the received document file on the image-only RAM 104 through the image printer 112 (411). Since only the cover page or the first page of the received document is automatically outputted and the remaining received pages may be taken out by reading in the superimposed image, the simple confidential reception function is realized. In addition, the received document is easily printed out without any need to search the HDD 106 storing a number of received document files for a desired document.

Figure 5A:
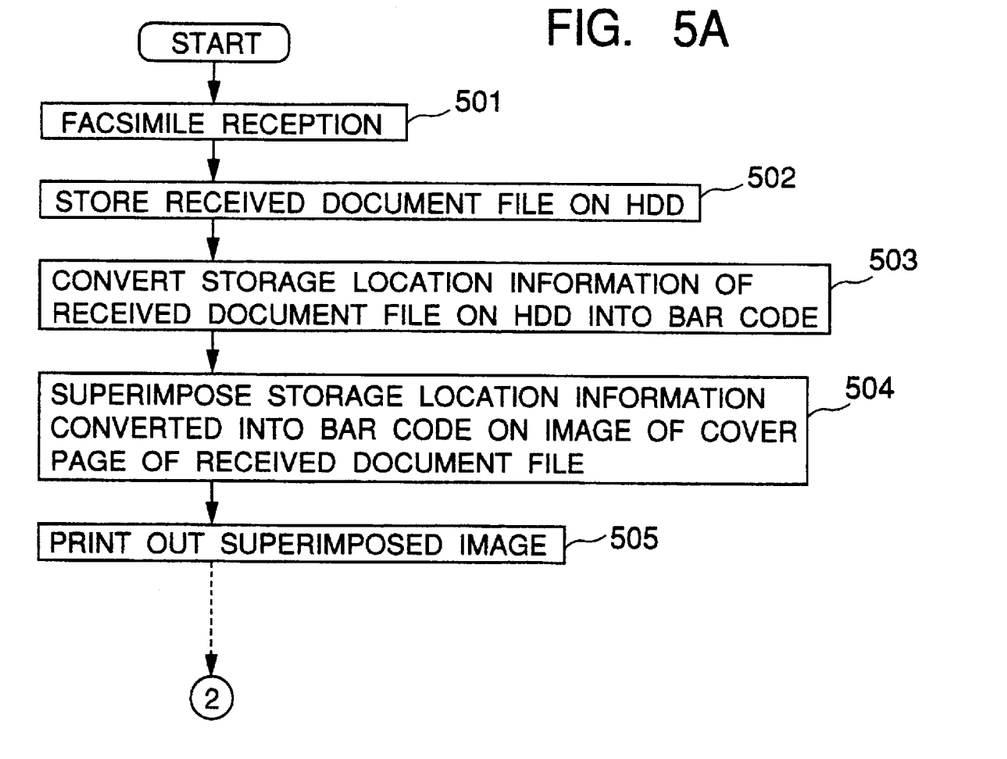
FIG. 5A is a flowchart of an embodiment of the present invention.
Figure 5B:
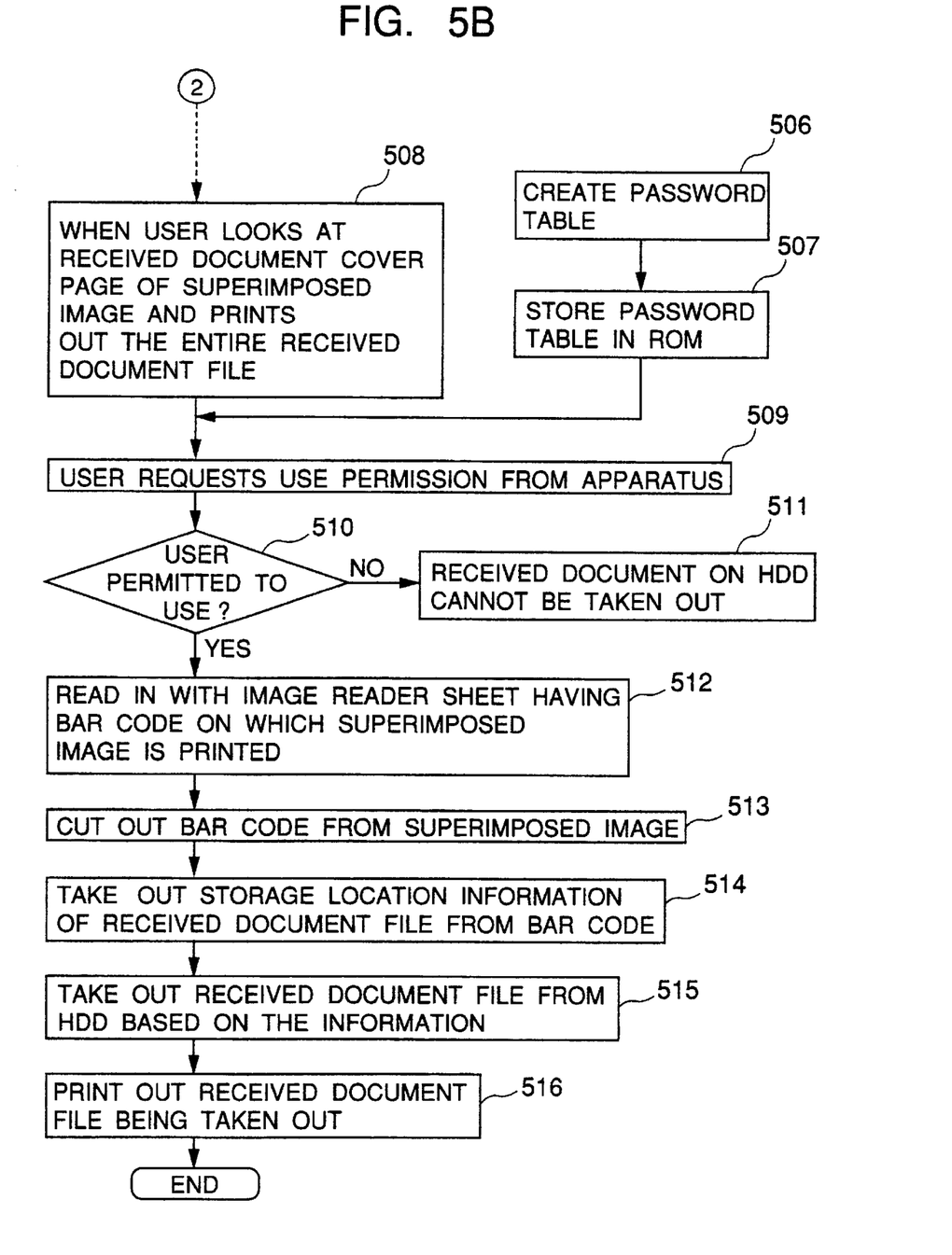
FIG. 5B is a flowchart of the embodiment of the present invention.

Subsequently, an operation procedure of a fourth embodiment will be described with reference to the structural view of FIG. 1 and the flowchart of FIGS. 5A and 5B. The structure of the image information processor of this embodiment will not be described because it is basically the same as that of FIG. 1. In FIG. 5A, steps 501 to 505 are similar to steps 401 to 405 in FIG. 4, and their descriptions are omitted for brevity.

In the third embodiment, the person in charge of the apparatus previously creates a password table which only the persons permitted to use the apparatus know (506) and stores the password table in the ROM 102 (507). Before reading in the printed superimposed image with the image reader 110, the user inputs a keyword as the password from the keyboard 108 (509). The CPU 101 places the inputted keyword on the RAM 103, compares the keyword with the password on the ROM 102 (510) and permits the readout with the image reader 110 when the keyword coincides with the password. Instead of inputting the keyword from the keyboard, the keyword may be inputted by inserting a magnetic card having the keyword written thereon into a magnetic card reader. Moreover, the same result is obtained by inserting an integrated circuit (IC) card having the keyword written thereon into an IC card reader Since even if the user tries to take out the received document by use of the paper on which the superimposed image is printed out, the received document cannot be taken out unless the user is permitted to use the apparatus, the simple confidential reception function is realized. In FIG. 5B, steps 512 to 516 are similar to steps 407 to 411 in FIG. 4, and their descriptions are omitted for brevity.

Figure 8:
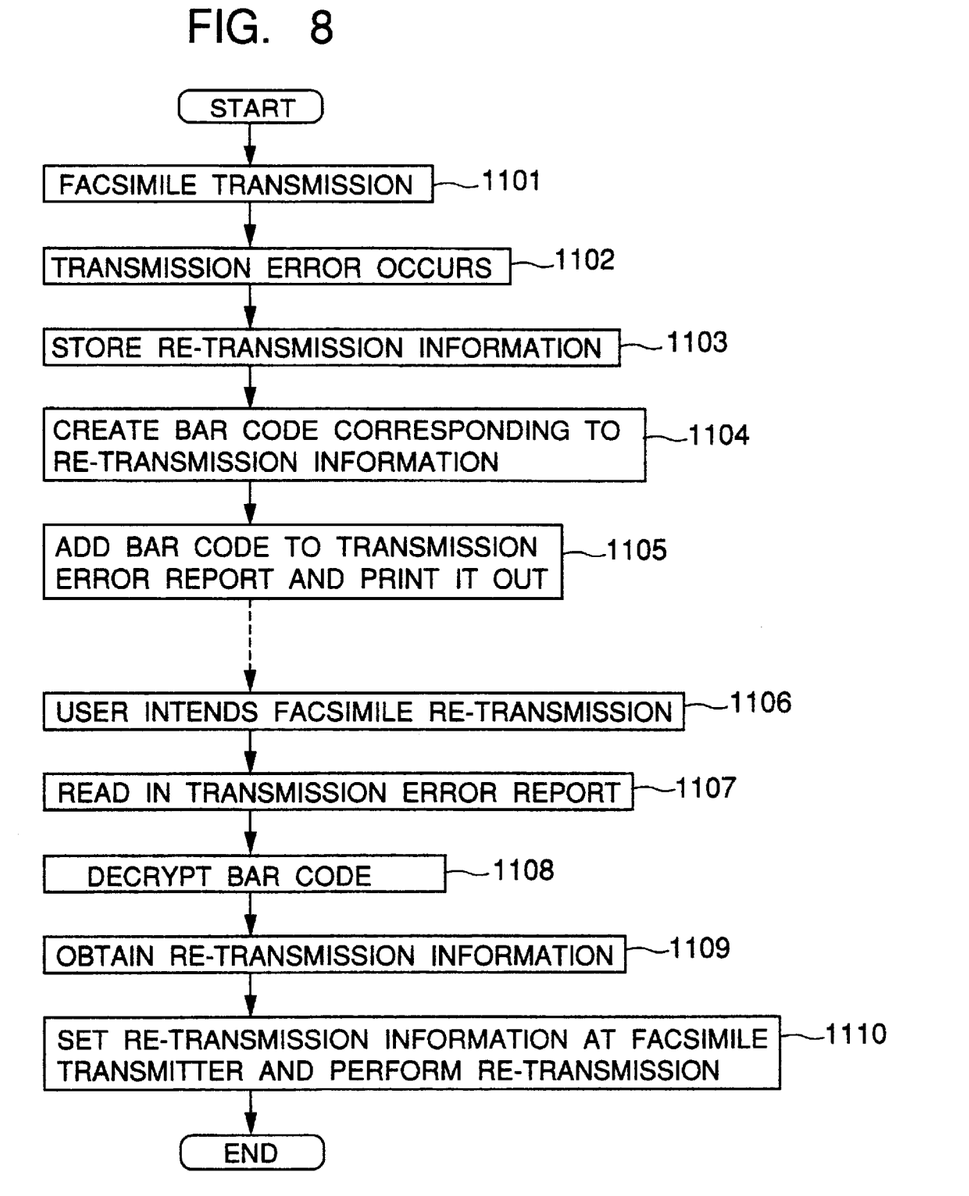
FIG. 8 is a flowchart of an embodiment of the present invention.

Subsequently, an operation procedure of a fifth embodiment will be described with reference to the structural view of FIG. 1 and the flowchart of FIG. 8.

An electronic file originally recorded on the HDD 106 or read out by the image reader 110 and recorded on the HDD 106 or the RAM 103 is facsimile-transmitted through the facsimile transmitter 116 (1101). When a transmission error occurs during the transmission (1102), the CPU 101 stores the file storage location information and transmission conditions such as the receiver's facsimile number 1201 and the date of transmission 1202 in the RAM 103 or the HDD 106 as re-transmission information (1103). The CPU 101 creates a bar code 1203 corresponding to the re-transmission information (1104), adds the bar code 1203 to a transmission error message 1205 outputted to inform the user of the transmission error, and prints out the transmission error message 1205 onto a sheet of paper through the image printer 112 so that it is discharged as a transmission error report sheet 1204 (1105). The transmission error report sheet 1204 corresponds to a medium of the present invention.

Figure 9:
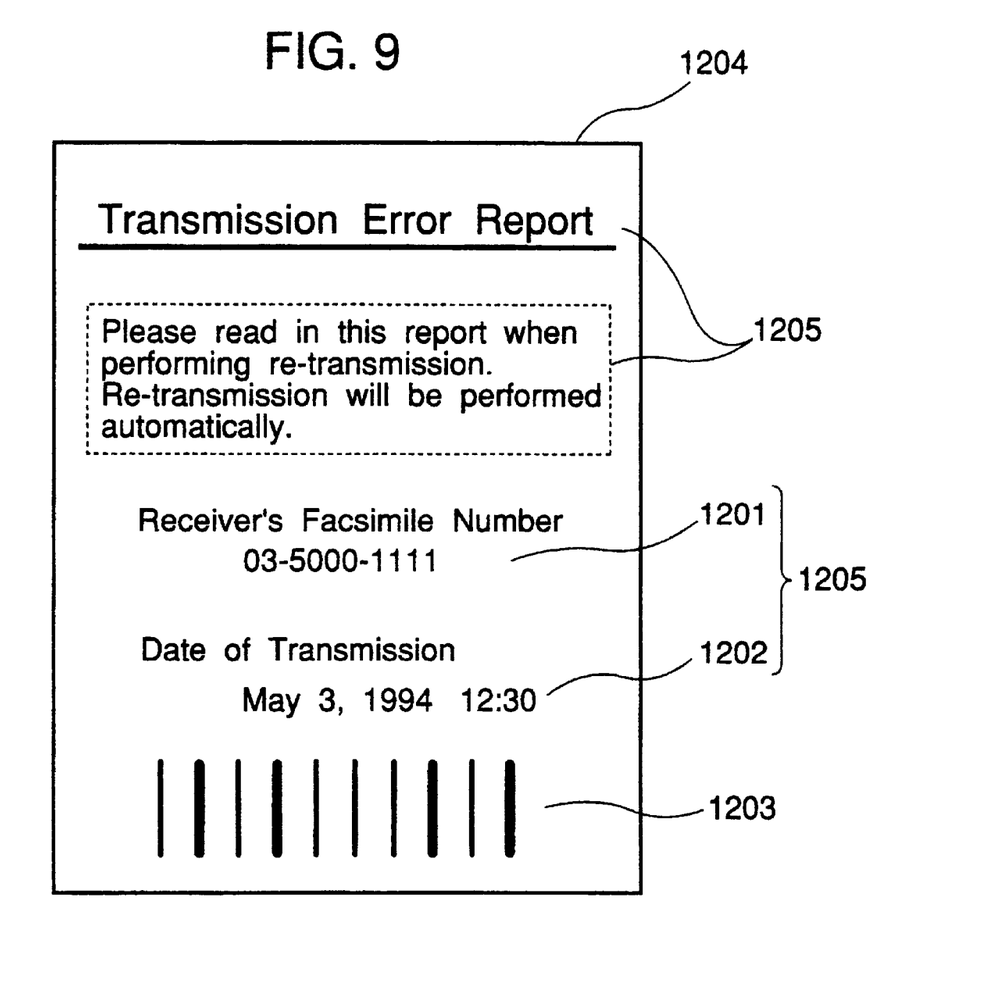
FIG. 9 shows a transmission error report sheet according to an embodiment of the present invention.

Then, when the user intends to perform re-transmission (1106), the transmission error report sheet 1204 having the bar code is set on the image reader 110 and the printed portion is read in (1107). The CPU 101 cuts out the bar code 1203 from the image information being read in and decrypts the bar code 1203 (1108) to thereby obtain re-transmission information corresponding to the bar code 1203 (1109). The CPU 101 sets transmission conditions at the facsimile transmitter 116 and performs facsimile re-transmission (1110). Thus, the user can perform facsimile re-transmission simply by performing a simple operation such that the transmission error report sheet 1204 is read in without any need to re-type the receiver's facsimile number or search for image information. Since a device such as a display is unnecessary which is necessary if the search for image information is performed, the price of the apparatus is reduced. An example of the transmission error report sheet 1204 is shown in FIG. 9.

While the identification information of the present invention is the storage location information in the above-described embodiments, any information such as an ID may be used that enables the identification of a desired electronic document file.

Needless to say, the electronic document file data of the present invention are not necessarily inputted through a facsimile.

While in the above-described embodiments, the image information communication apparatus of the present invention is described with respect to the case where the image information processor includes the function of the image information communication apparatus, the present invention is not limited thereto. The following arrangement, for example, may be used:

The image information communication apparatus may include a facsimile communication means for transmitting and receiving image information according to the facsimile format, a re-transmission information generating means for, when a transmission error occurs during the transmission according to the facsimile format, generating, together with a transmission error message, re-transmission information including receiver information for identifying the receiver of the facsimile transmission and information for identifying the image information whose transmission resulted in error, and a re-transmission control means for, when re-transmission according to the facsimile format is directed, causing the facsimile communication means to re-transmit the image information whose transmission resulted in error by use of the generated re-transmission information. The image information transmitter may be arranged to further include, in addition to the above-described means, a transmission error message outputting means for outputting the re-transmission information generated by the re-transmission information generating means and the error message so as to be shown on the same medium and so that the medium being outputted is set, the re-transmission information is read out from the medium being set and the re-transmission information being read out is used for the re-transmission by the facsimile communication means. Thus, even if a transmission error occurs during the facsimile transmission and re-transmission is necessitated, the facsimile re-transmission is easily performed simply by performing a simple operation such that the medium being outputted is set and read in.

Moreover, the operations of means of the above-described embodiments may be realized by means of software by the working of a program with a computer. Alternately, the operations may be realized by means of hardware with a particular circuit arrangement without the use of the computer.

As described above, according to the present invention, the identification of an electronic document file in the memory unit may easily be performed simply by reading in a printed output corresponding to the electronic document file without any need to display the electronic document file on the display unit for successive search.

Since the display unit for displaying the result of the successive search is unnecessary, the cost is reduced.

Since an attached document may.be facsimile-transmitted simply by reading it in together, the procedure to attach a facsimile transmission document is simplified.

In the case where the inputted use permission information is collated with the previously-recorded use permission information and the facsimile-received document is printed out only when both of the information coincide with each other, since persons not permitted to use the apparatus and not having the use permission information cannot take out the facsimile-received document even if they perform reading-in of the superimposed image with the intention to take out the facsimile-received document, a highly reliable simple confidential reception function is realized.

Additionally, even if a transmission error occurs during the facsimile transmission and re-transmission is necessitated, the facsimile re-transmission may be performed simply by performing a simple operation such that a transmission error report having a bar code corresponding to the re-transmission information is set and read in.

What is claimed is:

1. An image information processor comprising:

storage means for storing a plurality of electronic document files;

image superimposing and outputting means for superimposing identification information of an electronic document file stored in the storage means on image information of a specific page of the electronic document file, and providing a superimposed image;

readout means for reading the superimposed image, reading the identification information included in the superimposed image, and reading the electronic document file from the storage means;

communication means for transmitting and receiving the electronic document file according to a format;

transmission error message generating and outputting means for providing a medium showing a transmission error message when a transmission error occurs during transmission of the electronic document file and adding at least the identification information for identifying the electronic document file on the medium; and re-transmission control means for, when re-transmission according to the format is directed, causing the communication means to re-transmit the electronic document file whose transmission resulted in error by using the identification information added to the generated medium and receiver information for identifying a receiver of said electronic document file whose transmission resulted in error.

2. An image information processor according to claim 1, wherein the receiver information and the identification information are read from the generated medium, and the information being read is used in the re-transmission by the communication means.

3. An image information processor according to claim 1 wherein said communication means is facsimile communication means for transmitting and receiving the electronic document file according to a facsimile format; and when retransmission according to the facsimile format is directed, said re-transmission control means causes the facsimile communication means to re-transmit the electronic document file whose transmission resulted in error.

4. An image information processor according to claim 1 or 3 wherein said transmission error message generating and outputting means adds said receiver information to said medium together with said identification information.

5. An image information communication apparatus comprising:

facsimile communication means for transmitting and receiving image information according to a facsimile format;

re-transmission information generating means for, when a transmission error occurs during transmission according to the facsimile format, generating, together with a transmission error message, re-transmission information including at least information for identifying image information whose transmission resulted in error; and re-transmission control means for, when re-transmission according to the facsimile format is directed, causing the facsimile communication means to re-transmit the image information whose transmission resulted in error by using said generated information for identifying said image information whose transmission resulted in error and receiver information for identifying a receiver of said image information;

wherein said re-transmission information generating means generates said receiver information and said re-transmission information includes said receiver information; and transmission error message outputting means for outputting the re-transmission information and the transmis sion error message generated by the re-transmission information generating means on a medium, wherein the re-transmission information is read from the medium and the re-transmission information being read is used in the re-transmission by the facsimile communication means.

6. An image information communication apparatus comprising:

communication means for transmitting and receiving an electronic document file according to a facsimile format;

transmission error message generating and outputting means for providing a medium showing a transmission error message when a transmission error occurs during transmission of the electronic document file and adding at least identification information for identifying the electronic document file on the medium; and re-transmission control means for, causing the communication means to re-transmit the electronic document file whose transmission resulted in error by using the identification information added to the generated medium and receiver information for identifying a receiver of said electronic document file whose transmission resulted in error.

7. An image information communication apparatus comprising:

facsimile communication means for transmitting and receiving image information according to a facsimile format;

re-transmission information generating means for, when a transmission error occurs during transmission according to the facsimile format, generating, together with a transmission error message, re-transmission information including at least information for identifying image information whose transmission resulted in error;

re-transmission control means for, when a re-transmission according to the facsimile format is directed, causing the facsimile communication means to re-transmit the image information whose transmission resulted in error by using said generated information for identifying said image information whose transmission resulted in error and receiver information for identifying a receiver of said image information; and transmission error message outputting mean for outputting the re-transmission information and the transmission error message generated by the re-transmission information generating means on a medium;

wherein the re-transmission information generating means is read from the medium and the re-transmission information being read is used in the re-transmission by the facsimile communication means.

* * * * *